F. HODGKINSON.
ELASTIC FLUID TURBINE.
APPLICATION FILED FEB. 13, 1905.
937,996.
Patented Oct. 26, 1909.
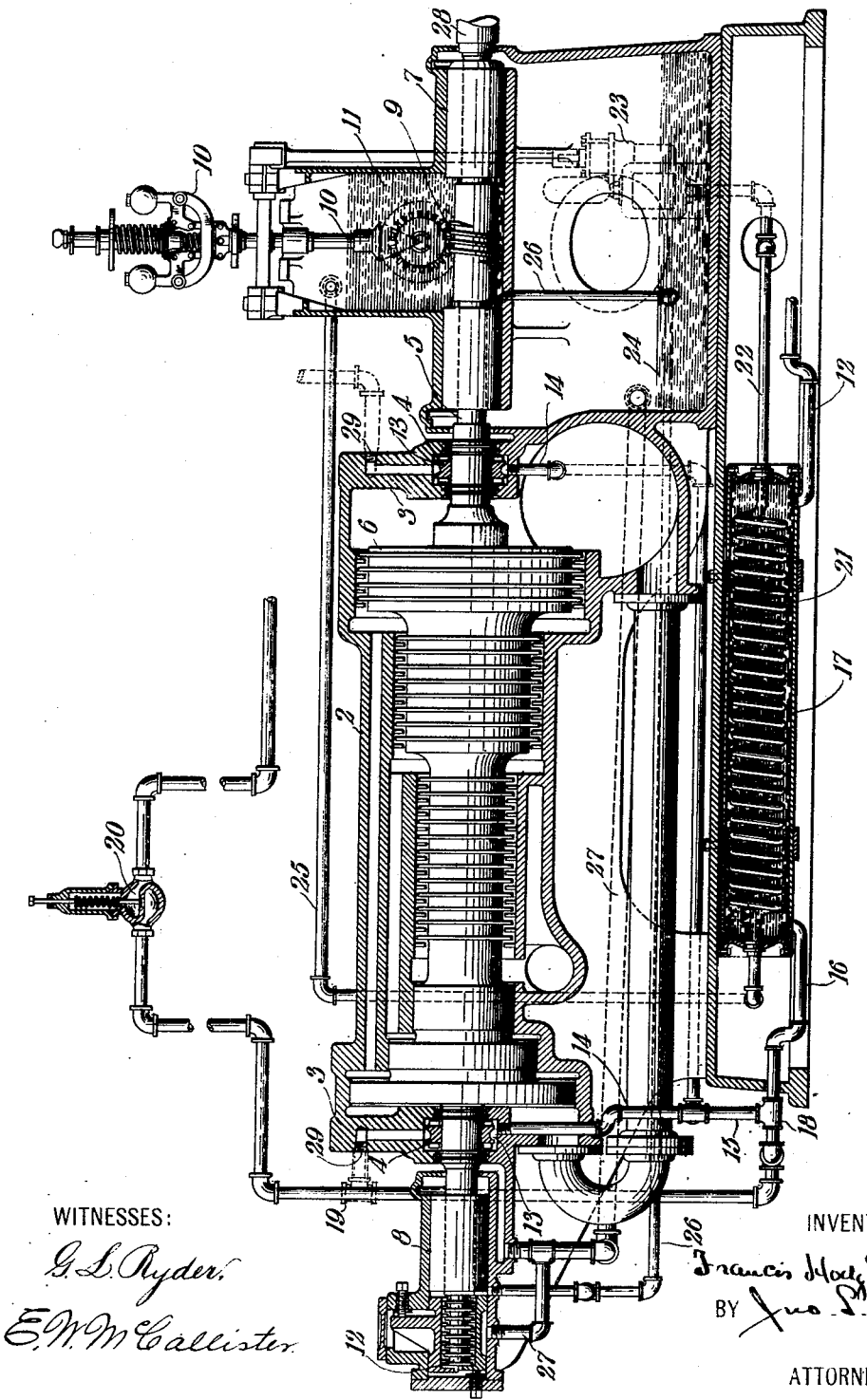
WITNESSES:
G. L. Ryder.
E. W. McCallister.
INVENTOR
Francis Hodgkinson
BY Jno. L. Green
ATTORNEY

UNITED STATES PATENT OFFICE.

FRANCIS HODGKINSON, OF EDGEWOOD PARK, PENNSYLVANIA, ASSIGNOR TO THE WESTINGHOUSE MACHINE COMPANY, A CORPORATION OF PENNSYLVANIA.

ELASTIC-FLUID TURBINE.

937,996.   Specification of Letters Patent.   Patented Oct. 26, 1909.

Application filed February 13, 1905. Serial No. 245,419.

*To all whom it may concern:*

Be it known that I, FRANCIS HODGKINSON, a subject of the King of Great Britain and Ireland, residing at Edgewood Park, in the county of Allegheny and State of Pennsylvania, have invented a new and useful Improvement in Elastic-Fluid Turbines, of which the following is a specification.

This invention relates to elastic fluid turbines, and more particularly to organized machines or apparatus of this class embodying among other novel features, means for packing or sealing the rotor shafts thereof and a system of lubrication for the shaft bearings. To the specific type of shaft packing utilized in this organized apparatus, no claims are made in this application as the same forms the subject matter of U. S. Patent No. 792,131, granted to me June 13, 1905.

Broadly speaking, each of the two shaft packings utilized consists of a runner mounted near an end of the turbine shaft, within a cylindrical chamber formed in each of the end walls of the turbine casing through which the shaft extends. Sealing liquid, such as water, is admitted to each of these chambers, and during the rotation of the shaft, forms liquid annuli which effectually seal the interior of the turbine from the atmosphere, whether the turbine is running condensing or non-condensing.

An object of this invention has been to so construct this organized apparatus that the liquid centrifugal shaft packings are placed between the shaft bearings and the interior of the turbine, whereby the passage of oil from said bearings to the interior of the turbine casing is absolutely prevented, and this is most essential when the turbine is running condensing and the water of condensation is to be re-utilized in the boilers.

A still further and more restricted object of this invention has been to provide simple and efficient means whereby the lubricating oil utilized in the organized apparatus—which oil, as it is continuously circulated, becomes heated—is maintained at a safe workable temperature by means of the water utilized for the shaft packing.

These and other objects I attain by means of the apparatus, the details and mode of operation of which are described in the following specification and illustrated in the accompanying single sheet of drawings, the single view of which comprises a longitudinal section of a steam or other elastic fluid turbine, together with piping and other elements entering into the make-up of the organized apparatus.

The turbine casing 2, which, as is now common, is divided on a horizontal plane through its axis, is provided in each of its end walls 3 with a runner chamber 4, and through suitable openings in each of these end walls the shaft 5 of the turbine rotor, or spindle 6, extends.

The rotor shaft is journaled within suitable bearings 7 and 8, and, from a worm 9 on said shaft adjacent to shaft bearing 7, the governing mechanism 10 for the apparatus is driven. The worm wheel of the governing apparatus meshing with said worm is situated within an oil chamber or tank 11.

Outside of bearing 8, and adjacent thereto, is a thrust bearing 12, whereby proper alinement of the turbine rotor is accomplished and maintained.

Carried by the rotor shaft and within each of the runner chambers 4, is a runner 13 provided with suitable blades or paddles whereby, during rotation of said shaft, the sealing fluid or water supplied to said chambers is caused to form a liquid seal or pressure annulus.

Water is admitted to the bottom of each of chambers 4 through suitable pipes 14, which by means of pipes 15 and 16 connect with an oil-cooling chamber or tank 17, which by means of a pipe 12 connects with any suitable source of water or other suitable liquid supply.

In order to maintain a predetermined desired pressure in the water sealing glands, I preferably connect the water system at some point below said glands, as at 18, with a suitable stand-pipe, which, if desired, may consist of a pipe 19 extending above the glands to a sufficient height to give the desired barometer pressure.

If it is deemed advisable, a suitable spring-loaded check-valve 20 may be included in pipe 19, and by adjusting the valve-spring the impedance to the flow through the pipe may be varied, and thereby the pressure within the packing glands controlled. If the stand-pipe, as before described, is utilized, the pressure may be varied by varying the position of the outlet of the pipe, and whether the spring-loaded valve or the stand-pipe is utilized, the overflow may be led back to the source of liquid supply and the liquid re-utilized. It has been found that when the turbine utilizing this form of shaft packing is run non-condensing, the heat imparted by the steam or other motive fluid to the liquid used for packing, causes said liquid to rapidly evaporate or boil, and it has been found desirable to connect the packing gland chambers, preferably by means of ducts 29 and suitable piping, to the pipe 19, whereby a circulation of the packing liquid is maintained without impairing the effectiveness of said packings.

When the turbine is running condensing, the tendency of the packing liquid to boil is slight, and as the vapor given off by this evaporation is discharged within the interior of the turbine casing, the duct 29, if desired, may be plugged in any suitable manner.

A coil of pipe or manifold 21, through which the lubricating oil is circulated, is placed within the cooling tank 17, and one end of the manifold, by means of a pipe 22, is connected to the outlet of a suitable oil pump 23, which receives its supply of oil from a suitable reservoir 24 located at some point below the shaft bearings. As illustrated in the drawings, this reservoir is preferably placed within the support for the shaft bearing adjacent to the governing mechanism. The other end of the manifold is connected, by means of a pipe 25, to the tank or chamber 11, within which the governor worm is located. This chamber 11 is connected to the box for bearing 7 by means of a pipe 26, and, on account of the level of the body of oil maintained in chamber 11, a sufficient quantity of oil flows through pipe 26 to effectually lubricate bearing 8. The oil thus supplied to bearing 7 flows back to reservoir 24 through overflow pipes 27. Shaft bearing 8 receives its supply of oil direct from tank or chamber 11, and the oil flows through this bearing into the reservoir 24.

28 represents any suitable form of flexible coupling whereby the turbine shaft is coupled to a generator shaft to be driven thereby, or the shaft of any other machine or apparatus which it is desired to drive.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

What I claim as new and useful, and desire to secure by Letters Patent of the United States, is:—

1. In an elastic fluid turbine, a turbine casing, a rotor shaft extending through opposite ends of said casing, bearings for said shaft exterior to said casing, means for supplying said bearings with oil and means employing water under pressure whereby the clearance around said shaft within each end wall of said casing is hermetically sealed and oil from said bearings is prevented from entering said casing.

2. In an elastic fluid turbine, water-sealing glands for the shaft of said turbine, bearings for said shaft, a circulatory system for continuously supplying said bearings with oil, an oil cooling device included in said circulatory system, a source of water supply under pressure for said glands, means for accomplishing the desired pressure of water in said glands irrespective of the pressure of said source, and means whereby the water so supplied to said glands is utilized in said oil cooling device.

3. In an elastic fluid turbine, a water sealing gland for the shaft of said turbine, comprising a disk rigidly mounted on said shaft, a chamber in which said disk is located, a body of liquid in said chamber, a circulatory system for said liquid, exterior to and including said chamber, and means for retarding the flow of liquid through said system to increase the pressure in said chamber.

4. In an elastic fluid turbine, a water sealing gland for the shaft of said turbine, comprising a disk rigidly mounted on said shaft, a chamber in which said disk is located, a body of liquid in said chamber, a circulatory system for said liquid, comprising a tank, suitable piping and means in said piping for regulating the pressure in said chamber by retarding the flow of liquid through said system.

5. In combination, a turbine casing, a rotatable shaft extending through said casing, bearings for said shaft exterior to said casing, means for supplying said bearings with lubricant, a water circulatory system, a chamber surrounding said shaft and included in said system, means secured to said shaft for creating liquid pressure within said chamber, whereby the clearance between said shaft and said casing is hermetically sealed, and means included within said circulatory system for cooling the liquid delivered to said bearings.

6. In combination in an elastic fluid turbine, bearings for the shaft of said turbine, a circulatory system for supplying lubricant to said bearings, a lubricant cooling device within said system, water sealing glands for the shaft of the turbine, a water circulatory system for supplying water to said glands and means within said system whereby the water supplied to said glands is utilized as a cooling agent in the lubricant cooling device.

7. In combination in an elastic fluid turbine, bearings for the shaft of said turbine, a circulatory system for continuously supplying lubricant to said bearings, a water sealing gland for the shaft of the turbine, a water circulatory system for supplying water to said gland, a source of water supply under pressure for said system, means for maintaining the desired water pressure within said gland irrespective of the pressure of said source and means included within the water circulatory system whereby the water supplied to said gland is utilized as a cooling agent in the lubricant cooling device.

8. In combination in an elastic fluid turbine, bearings for the shaft of said turbine, a circulatory system for supplying lubricant to said bearing, a lubricant cooling device within said system, a water circulatory system, a chamber surrounding said shaft and included within said system, means, secured to said shaft, for creating water pressure within said chamber whereby the clearance between said shaft and the casing of said turbine is hermetically sealed and means included within said water circulatory system whereby the water delivered to said chamber is utilized as a cooling agent for said lubricant cooling device.

9. In an elastic fluid turbine, in combination with the rotor and stator elements of the turbine, bearings for the rotor element, a circulatory system for supplying lubricant to said bearings, a lubricant cooling device included within said system, a water circulatory system, a chamber surrounding said rotor element and included within said system, a disk located within said chamber and rigidly mounted on said element, whereby water pressure is created within said chamber to hermetically seal the clearance between said rotor and said stator elements and means included within said water circulatory system whereby the water delivered to said chamber is utilized as a cooling agent in said lubricant cooling device.

In testimony whereof I have hereunto subscribed my name this 10th day of February, 1905.

FRANCIS HODGKINSON.

Witnesses:
W. S. THOMPSON,
DAVID WILLIAMS.